US012767804B2

(12) United States Patent
Liu et al.

(10) Patent No.: US 12,767,804 B2
(45) Date of Patent: Oct. 20, 2026

(54) MODIFIED POLYMER RECYCLATES

(71) Applicant: Borealis AG, Vienna (AT)

(72) Inventors: Yi Liu, Linz (AT); Susanne Kahlen, Linz (AT); Hermann Braun, Linz (AT)

(73) Assignee: Borealis AG, Vienna (AT)

( * ) Notice: Subject to any disclaimer, the term of this patent is extended or adjusted under 35 U.S.C. 154(b) by 429 days.

(21) Appl. No.: 18/576,864

(22) PCT Filed: Jul. 6, 2022

(86) PCT No.: PCT/EP2022/068655

§ 371 (c)(1),
(2) Date: Jan. 5, 2024

(87) PCT Pub. No.: WO2023/280890

PCT Pub. Date: Jan. 12, 2023

(65) Prior Publication Data

US 2025/0289945 A1 Sep. 18, 2025

(30) Foreign Application Priority Data

Jul. 7, 2021 (EP) .................................... 21184319

(51) Int. Cl.
*C08L 23/12* (2006.01)
*C08J 3/20* (2006.01)

(52) U.S. Cl.
CPC ............... *C08L 23/12* (2013.01); *C08J 3/203* (2013.01); *C08J 2323/12* (2013.01); *C08J 2423/06* (2013.01); *C08J 2423/08* (2013.01); *C08L 2205/03* (2013.01); *C08L 2207/20* (2013.01)

(58) Field of Classification Search
CPC .. C08L 23/12; C08L 2205/03; C08L 2207/20; C08J 3/203; C08J 2323/12; C08J 2423/06; C08J 2423/08; Y02W 30/62
See application file for complete search history.

(56) References Cited

U.S. PATENT DOCUMENTS

| | | | |
|---|---|---|---|
| 9,637,602 | B2 | 5/2017 | Potter et al. |
| 9,670,293 | B2 | 6/2017 | Reznichenko et al. |
| 9,670,347 | B2 | 6/2017 | Töltsch et al. |
| 9,708,481 | B2 | 7/2017 | Wang et al. |
| 9,745,431 | B2 | 8/2017 | Potter et al. |
| 9,751,962 | B2 | 9/2017 | Wang et al. |
| 9,777,142 | B2 | 10/2017 | Sandholzer et al. |
| 9,802,394 | B2 | 10/2017 | Cavacas et al. |
| 9,828,698 | B2 | 11/2017 | Wang et al. |
| 9,890,275 | B2 | 2/2018 | Sandholzer et al. |
| 9,976,020 | B2 | 5/2018 | Nummila-Pakarinen et al. |
| 10,011,708 | B2 | 7/2018 | Lampela et al. |
| 10,030,109 | B2 | 7/2018 | Boragno et al. |
| 10,040,930 | B2 | 8/2018 | Gloger et al. |
| 10,100,185 | B2 | 10/2018 | Wang et al. |
| 10,100,186 | B2 | 10/2018 | Wang et al. |
| 10,227,427 | B2 | 3/2019 | Reichelt et al. |
| 10,450,451 | B2 | 10/2019 | Wang et al. |
| 10,519,259 | B2 | 12/2019 | Resconi et al. |
| 10,870,718 | B2 | 12/2020 | Denifl et al. |
| 11,292,900 | B2 | 4/2022 | Gahleitner et al. |
| 11,299,617 | B2 | 4/2022 | Prieto et al. |
| 11,390,732 | B2 | 7/2022 | Van Houcke et al. |
| 11,492,478 | B2 | 11/2022 | Kniesel et al. |
| 11,504,949 | B2 | 11/2022 | Oderkerk et al. |
| 11,518,863 | B2 | 12/2022 | Vijay |
| 11,530,321 | B2 | 12/2022 | Kniesel et al. |
| 11,827,758 | B2 | 11/2023 | Jerabek et al. |
| 11,827,777 | B2 | 11/2023 | Wang et al. |
| 11,834,529 | B2 | 12/2023 | Wang et al. |
| 11,851,552 | B2 | 12/2023 | Gloger et al. |
| 11,912,849 | B2 | 2/2024 | Jerabek et al. |
| 11,945,926 | B2 | 4/2024 | Kahle et al. |
| 11,981,781 | B2 | 5/2024 | Prieto et al. |
| 12,006,426 | B2 | 6/2024 | Wang et al. |
| 12,043,687 | B2 | 7/2024 | Krallis et al. |
| 12,049,552 | B2 | 7/2024 | Kulshreshtha et al. |
| 2003/0130429 | A1 | 7/2003 | Bouilloux et al. |
| 2015/0037557 | A1 | 2/2015 | Wang et al. |
| 2016/0185946 | A1 | 6/2016 | Sandholzer et al. |
| 2016/0194486 | A1 | 7/2016 | Sandholzer et al. |
| 2016/0200838 | A1 | 7/2016 | Reznichenko et al. |
| 2016/0208085 | A1 | 7/2016 | Gloger et al. |
| 2016/0229158 | A1 | 8/2016 | Cavacas et al. |
| 2016/0237270 | A1 | 8/2016 | Wang et al. |
| 2016/0244539 | A1 | 8/2016 | Resconi et al. |
| 2016/0272740 | A1 | 9/2016 | Wang et al. |
| 2016/0280899 | A1 | 9/2016 | Töltsch et al. |
| 2016/0304681 | A1 | 10/2016 | Potter et al. |

(Continued)

FOREIGN PATENT DOCUMENTS

| | | |
|---|---|---|
| CN | 105504529 A | 4/2016 |
| CN | 106543659 A | 3/2017 |

(Continued)

OTHER PUBLICATIONS

Signoret et al., "Alterations of plastic spectra in MIR and the potential impacts on identification towards recycling," *Resources, Conservation and Recycling* 161: 104980 (2020).

(Continued)

*Primary Examiner* — Kumar R Bhushan
(74) *Attorney, Agent, or Firm* — Leydig, Voit & Mayer, Ltd.

(57) ABSTRACT

Disclosed is a polymer composition comprising at least the following components: A) 75 to 95.5 wt.-% based on the overall weight of the polymer composition of a polymer blend, comprising polypropylene and polyethylene and wherein A) is a recycled material; (B) 4.5 to 25 wt.-% based on the overall weight of the polymer composition of a virgin ethylene alkyl (meth)acrylate having $MFR_2$ (190° C., 2.16 kg) per ISO 1133 from 0.1 to 15 g/10 min; and an alkyl (meth)acrylate content of component B) in the range from 5 to 40 wt.-%; the weight proportions of A) and B) add up to 100 wt.-%. Also disclosed is a process for manufacturing the polymer composition, to the use of (B) for increasing the mechanical properties of polymer blend A).

16 Claims, No Drawings

(56) References Cited

U.S. PATENT DOCUMENTS

| | | | |
|---|---|---|---|
| 2016/0311951 | A1 | 10/2016 | Reichelt et al. |
| 2016/0311988 | A1 | 10/2016 | Potter et al. |
| 2016/0312018 | A1 | 10/2016 | Vestberg et al. |
| 2016/0312019 | A1 | 10/2016 | Lampela et al. |
| 2016/0347943 | A1 | 12/2016 | Wang et al. |
| 2016/0347944 | A1 | 12/2016 | Wang et al. |
| 2017/0009068 | A1 | 1/2017 | Kahlen et al. |
| 2017/0029980 | A1 | 2/2017 | Wang et al. |
| 2017/0137617 | A1 | 5/2017 | Wang et al. |
| 2017/0151609 | A1 | 6/2017 | Elsen et al. |
| 2017/0166711 | A1 | 6/2017 | Boragno et al. |
| 2017/0218172 | A1 | 8/2017 | Wang et al. |
| 2017/0313867 | A1 | 11/2017 | Lampela et al. |
| 2017/0321048 | A1 | 11/2017 | Nummila-Pakarinen et al. |
| 2018/0079875 | A1 | 3/2018 | Brau et al. |
| 2018/0194881 | A1 | 7/2018 | Denifl et al. |
| 2020/0263015 | A1 | 8/2020 | Kniesel et al. |
| 2020/0270434 | A1 | 8/2020 | Van Houcke et al. |
| 2020/0277479 | A1 | 9/2020 | Jerabek et al. |
| 2020/0308353 | A1 | 10/2020 | Jerabek et al. |
| 2020/0347216 | A1 | 11/2020 | Kniesel et al. |
| 2020/0392321 | A1 | 12/2020 | Gahleitner et al. |
| 2021/0114352 | A1 | 4/2021 | Oderkerk et al. |
| 2021/0171749 | A1 | 6/2021 | Kumar et al. |
| 2021/0171750 | A1 | 6/2021 | Gahleitner et al. |
| 2021/0214527 | A1 | 7/2021 | Gahleitner et al. |
| 2021/0214533 | A1 | 7/2021 | Kulshreshtha et al. |
| 2021/0238376 | A1 | 8/2021 | Kahlen et al. |
| 2021/0253836 | A1 | 8/2021 | Gahleitner et al. |
| 2021/0269560 | A1 | 9/2021 | Krallis et al. |
| 2021/0324189 | A1 | 10/2021 | Prieto et al. |
| 2021/0332227 | A1 | 10/2021 | Wang et al. |
| 2021/0347971 | A1 | 11/2021 | Wang et al. |
| 2022/0033631 | A1 | 2/2022 | Gloger et al. |
| 2022/0135779 | A1 | 5/2022 | Wang et al. |
| 2022/0204719 | A1 | 6/2022 | Vijay |
| 2022/0227965 | A1 | 7/2022 | Ruemer et al. |
| 2022/0251256 | A1 | 8/2022 | Wang et al. |
| 2022/0289955 | A1 | 9/2022 | Kahlen et al. |
| 2022/0306844 | A1 | 9/2022 | Kahlen et al. |
| 2022/0315716 | A1 | 10/2022 | Prieto et al. |
| 2022/0356330 | A1 | 11/2022 | Kahlen et al. |
| 2023/0046086 | A1 | 2/2023 | Al-Haj Ali et al. |
| 2023/0047329 | A1 | 2/2023 | Al-Haj Ali |
| 2023/0212338 | A1 | 7/2023 | Wang et al. |
| 2024/0043584 | A1 | 2/2024 | Wang et al. |

FOREIGN PATENT DOCUMENTS

| | | | |
|---|---|---|---|
| CN | 107118435 | * | 9/2017 |
| CN | 107118435 | A | 9/2017 |
| CN | 107286701 | A | 10/2017 |
| CN | 109206769 | A | 1/2019 |
| CN | 109705459 | A | 5/2019 |
| CN | 111138829 | * | 5/2020 |
| CN | 111138829 | A | 5/2020 |
| EP | 3 145 995 | A2 | 3/2017 |
| EP | 3 540 009 | A1 | 9/2019 |
| JP | H05-132595 | A | 5/1993 |
| JP | 2006-274065 | A | 10/2006 |
| WO | 2015/177580 | A2 | 11/2015 |
| WO | WO 2019/240899 | A1 | 12/2019 |
| WO | 2021/032459 | A1 | 2/2021 |
| WO | WO 2021/032459 | * | 2/2021 |

OTHER PUBLICATIONS

European Patent Office, International Search Report in International Application No. PCT/EP2022/068655 (Oct. 4, 2022).

European Patent Office, Written Opinion in International Application No. PCT/EP2022/068655 (Oct. 4, 2022).

International Bureau of WIPO, International Preliminary Report on Patentability in International Application No. PCT/EP2022/068655 (Dec. 14, 2023).

Schyns et al., "Mechanical Recycling of Packaging Plastics: A Review," Macromol Rapid Commun 2000415 (2020), Wiley-VCH GmbH, 27 pgs., DOI: 10.1002/marc.202000415.

* cited by examiner

MODIFIED POLYMER RECYCLATES

CROSS-REFERENCE TO RELATED APPLICATIONS

This patent application is the U.S. national phase of International Application No. PCT/EP2022/068655, filed on Jul. 6, 2022, which claims the benefit of European Patent Application No. 21184319.8, filed Jul. 7, 2021.

The present invention relates to a polymer composition comprising a specific recyclate blend and a specific virgin ethylene alkyl (meth)acrylate, a process for manufacturing said polymer composition and to the use of the virgin ethylene alkyl (meth)acrylate for improving mechanical properties of the specific recyclate blend.

Polyolefins, in particular polyethylene and polypropylene are increasingly consumed in large amounts in a wide range of applications, including packaging for food and other goods, fibres, automotive components, and a great variety of manufactured articles. The reason for this is not only a favourable price/performance ratio, but also the high versatility of these materials and a very broad range of possible modifications, which allows tailoring of end-use properties in a wide range of applications. Chemical modifications, copolymerisation, blending, drawing, thermal treatment and a combination of these techniques can convert common-grade polyolefins into valuable products with desirable properties. This has led to huge amounts of polyolefin materials being produced for consumer applications.

During the last decade, concern about plastics and the environmental sustainability of their use in current quantities has arisen. This has led to new legislation on disposal, collection and recycling of polyolefins. There have, in addition, been efforts in a number of countries to increase the percentage of plastic materials, which are recycled instead of being sent to landfill.

One major trend in the field of polyolefins is the use of recycled materials, which are derived from a wide variety of sources. Mechanical recycling of polymer waste from various collection systems is the main target of present developments in the field. The recycled plastics typically comprise several types of polymers. For recyclates of polyolefins, mixture of polypropylene (PP) and polyethylene (PE) are commonly seen and the content of PP/PE depends on not only the feedstock, but also on the recycling process. Furthermore, other polar polymers, e.g., ethylene vinylacetate (EVA), polyamide (PA), polyethylene terephthalare (PET), etc. may not be fully removed during sorting and stay in the pellet of polyolefine recyclate. As such, the mechanical performance of the mechanically recycled polyolefines is inferior to the virgin PP or PE. However, there is a strong need for recyclates having good mechanical properties. The prior art describes ways for improving the mechanical properties of recyclates.

CN 106543659 A relates to a regenerated plastic particle. The regenerated plastic particle comprises the following components: modified recycled plastic, intumescent flame retardant, barium sulfate, graphene, antioxidant, brightener and plasticizer. The recycled plastic is modified by in-process compatilizer, toughener and chain extender.

EP 3 145 995 A2 relates to the recycling of polyamide and polyolefin wastes and fiber reinforced plastic wastes. Particularly, to polymer blends and homogenous polymer agglomerates containing polyamide and polyolefin wastes or co-extruded film wastes and glass fiber reinforced plastic wastes, and to a single-stage continuous process for the preparation of said agglomerate.

US 2015/0037557 A1 relates to film compositions and articles including recycled elastomer. The compositions comprise one or more virgin polymers. Optionally, the films may also include one or more compatibilizers having compatibility with the polymers and a thermoplastic elastomer (TPE) such as a block copolymer with a hard block and a soft block. Multi- or mono-layer films are possible. The films are useful for packaging films or component films for consumer products.

CN 107286701 A relates to a preparation method of waste plastic regenerated granules. The method includes the steps of: performing melting mixing to raw materials at 240 to 340° C., the raw materials including, by weight, 80 to 95 parts of waste plastic, 2 to 3 parts of a thermal stabilizer, 4 to 9 parts of a composite flexibilizer, and 1 to 3 parts of a thermal dispersant; and successively performing extrusion, wire drawing, cooling and granule cutting.

The known polymer compositions comprising recycled materials still show some disadvantages. There is a great need for recyclate-based polymer compositions with improved mechanical properties, in particular improved Charpy Notch Impact Strength and Tensile strain at break.

It was the objective of the present invention to overcome the disadvantages of the polymer compositions according to the prior art. In particular, it was one object of the present invention to provide polymer compositions having a high toughness, expressed by the Charpy Notched Impact Strength and Tensile strain at break.

This objective has been solved by the polymer composition according to the present invention comprising at least the following components A) 75 to 95.5 wt.-% based on the overall weight of the polymer composition of a polymer blend, comprising
   - a1) polypropylene;
   - a2) polyethylene;

wherein the weight ratio of a1) to a2) is from 3:7 to 9:1; and wherein the polymer blend A) is a recycled material;

B) 4.5 to 25 wt.-% based on the overall weight of the polymer composition of a virgin ethylene alkyl (meth) acrylate having the following properties
   - $MFR_2$ (190° C., 2.16 kg) determined according to ISO 1133 in the range from 0.1 to 15 g/10 min; and
   - an alkyl (meth)acrylate content based on the total weight of component B) in the range from 5 to 40 wt.-%;

with the proviso that the weight proportions of components A) and B) add up to 100 wt.-%.

Advantageous embodiments of the polymer composition in accordance with the present invention are also specified herein.

The present invention further relates to a process for manufacturing a polymer composition described herein, comprising the following steps:

i) providing a polymer blend A) of a recycled material comprising a1) polypropylene and a2) polyethylene in a weight ratio of a1) to a2) from 3:7 to 9:1 in an amount of 75.5 to 95.5 wt.-% based on the overall weight of the polymer composition;

ii) providing a virgin ethylene alkyl (meth)acrylate B) having the following properties
   - $MFR_2$ (190° C., 2.16 kg) determined according to ISO 1133 in the range from 0.1 to 15 g/10 min; and
   - an alkyl (meth)acrylate content based on the total weight of component B) in the range from 5 to 40 wt.-%;

iii) melting and mixing components A) and B) to obtain the polymer composition; and iv) optionally, cooling down the polymer composition obtained in step iii) and/or pelletizing the polymer composition.

Preferred embodiments of the process according to the present invention are also described.

Also described is the use of a virgin ethylene alkyl (meth)acrylate B) having the following properties MFR$_2$ (190° C., 2.16 kg) determined according to ISO 1133 in the range from 0.1 to 15 g/10 min; and an alkyl (meth)acrylate content based on the total weight of component B) in the range from 5 to 40 wt.-%;

for increasing the Tensile Strain at Break measured according to ISO527-2; and/or the Charpy Notched Impact Strength measured according to ISO 179-1eA at 23° C. of a polymer blend A) of a recycled material comprising a1) polypropylene and a2) polyethylene in a weight ratio of a1) to a2) from 3:7 to 9:1; whereby the virgin ethylene alkyl (meth)acrylate B) is present in an amount of 4.5 to 25 wt.-% based on the overall weight of components A) and B).

An article comprising the polymer composition according to the present invention is also described herein.

Definitions

Indications of Quantity

The polymer compositions in accordance with the present invention comprise the components A) and B) and optionally additives. The requirement applies here that the components A) and B) and if present the additives add up to 100 wt.-% in sum. The fixed ranges of the indications of quantity for the individual components A) and B) and optionally the additives are to be understood such that an arbitrary quantity for each of the individual components can be selected within the specified ranges provided that the strict provision is satisfied that the sum of all the components A), B) and optionally the additives add up to 100 wt.-%.

For the purposes of the present description and of the subsequent claims, the term "recycled" is used to indicate that the material is recovered from post-consumer waste and/or industrial waste. Namely, post-consumer waste refers to objects having completed at least a first use cycle (or life cycle), i.e. having already served their first purpose and been through the hands of a consumer; while industrial waste refers to the manufacturing scrap which does normally not reach a consumer. In the gist of the present invention "recycled polymers" may also comprise up to 17 wt.-%, preferably up to 3 wt.-%, more preferably up to 1 wt.-% and even more preferably up to 0.1 wt.-% based on the overall weight of the recycled polymer of other components originating from the first use. Type and amount of these components influence the physical properties of the recycled polymer. The physical properties given below refer to the main component of the recycled polymer.

Typical other components originating from the first use are thermoplastic polymers, like polystyrene and PA 6, talc, chalk, ink, wood, paper, limonene and fatty acids. The content of polystyrene (PS) and polyamide 6 (PA 6) in recycled polymers can be determined by Fourier Transform Infrared Spectroscopy (FTIR) and the content of talc, chalk, wood and paper may be measured by Thermogravimetric Analysis (TGA).

The term "virgin" denotes the newly produced materials and/or objects prior to first use and not being recycled. In case that the origin of the polymer is not explicitly mentioned the polymer is a "virgin" polymer.

Where the term "comprising" is used in the present description and claims, it does not exclude other non-specified elements of major or minor functional importance. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Whenever the terms "including" or "having" are used, these terms are meant to be equivalent to "comprising" as defined above.

Where an indefinite or definite article is used when referring to a singular noun, e.g. "a", "an" or "the", this includes a plural of that noun unless something else is specifically stated.

Component A)

The polymer composition in accordance with the present invention comprises as component A) 75 to 95.5 wt.-% based on the overall weight of the polymer composition of a polymer blend, comprising a1) polypropylene; a2) polyethylene; wherein the weight ratio of a1) to a2) is from 3:7 to 9:1; and wherein the polymer blend A) is a recycled material.

Preferred embodiments of component A) will be discussed in the following.

According to one preferred embodiment in accordance with the present invention component A) comprises 80.0 to 99.9 wt.-%, preferably 90.0 to 99.0 wt.-% and more preferably 94.0 to 98.0 based on the overall weight of component A) of polypropylene a1) and polyethylene a2).

Still another preferred embodiment of the present invention stipulates that component A) comprises less than 5 wt.-%, preferably less than 3 wt.-% and more preferably from 0.01 to 2 wt.-% based on the overall weight of component A) of thermoplastic polymers different from a1) and a2), preferably less than 4.0 wt.-% PA 6 and less than 5 wt.-% polystyrene, more preferably component A) comprises 0.01 to 4 wt.-% polystyrene.

In another preferred embodiment according to the present invention component A) comprises less than 5 wt.-%, preferably less than 4 wt.-% and more preferably from 0.01 to 3 wt.-% based on the overall weight of component A) of talc.

According to another preferred embodiment in accordance with the present invention component A) comprises less than 4 wt.-%, preferably less than 3 wt.-% and more preferably from 0.01 to 2 wt.-% based on the overall weight of component A) of chalk.

A further preferred embodiment in accordance with the present invention stipulates that component A) comprises less than 1 wt.-%, preferably less than 0.5 wt.-% and more preferably from 0.01 to 1 wt.-% based on the overall weight of component A) of paper.

In a further preferred embodiment of the present invention component A) comprises less than 1 wt.-%, preferably less than 0.5 wt.-% and more preferably from 0.01 to 1 wt.-% based on the overall weight of component A) of wood.

According to another preferred embodiment in accordance with the present invention component A) comprises less than 1 wt.-%, preferably less than 0.5 wt.-% and more preferably from 0.01 to 1 wt.-% based on the overall weight of component A) of metal.

In a further preferred embodiment according to the present invention component A) comprises less than 100 ppm, preferably from 0.1 to 100 ppm based on the overall weight of component A) of limonene.

Still another preferred embodiment in accordance with the present invention stipulates that component A) comprises less than 200 ppm, preferably from 1 to 200 ppm based on the overall weight of component A) of fatty acids.

In another preferred embodiment according to the present invention component A) is a recycled material, which is recovered from waste plastic material derived from post-consumer and/or post-industrial waste.

In a further preferred embodiment of the present invention the $MFR_2$ (230° C., 2.16 kg) determined according to ISO 1133 of component A) is in the range of 2 to 50 g/10 min, preferably in the range of 4 to 25 g/10 min and more preferably in the range from 4 to 8 g/10 min.

Still another preferred embodiment according to the present stipulates that the content of component A) in the polymer composition is in the range from 76 to 95.1 wt.-%, preferably in the range from 77 to 95 wt.-% or in the range from 80 to 95 wt.-% based on the overall weight of the polymer composition.

According to another preferred embodiment in accordance with the present invention the content of polypropylene a1) in component A) is in the range from 75 up to 98 wt.-%, preferably from 75 to 95 wt.-%, more preferably in the range from 76 to 85 wt.-%, still more preferably in the range from 78 to 82 wt.-% and most preferably in the range from 79 to 81 wt.-% based on the overall weight of component A), or the content of polypropylene a1) in component A) is in the range from 25 to 85 wt.-%, preferably in the range from 40 to 80 wt.-%, more preferably in the range from 50 to 65 wt.-% and most preferably in the range from 56 to 57 wt.-% based on the overall weight of component A), even more preferably component a1) comprises more than 95 wt.-%, still more preferably from 96 to 99.9 wt.-% isotactic polypropylene and most preferably consists of isotactic polypropylene.

In another preferred embodiment according to the present invention the content of polypropylene a2) in component A) is in the range from 5 to 25 wt.-%, preferably in the range from 15 to 24 wt.-%, more preferably in the range from 18 to 22 wt.-% and most preferably in the range from 19 to 21 wt.-% based on the overall weight of component A); or the content of polypropylene a2) in component A) is in the range from 15 to 75 wt.-%, preferably in the range from 20 to 60 wt.-%, more preferably in the range from 35 to 50 wt.-% and most preferably in the range from 43 to 44 wt.-% based on the overall weight of component A).

In a further preferred embodiment the polypropylene a1) comprises one or more polymer materials selected from the following:

I) isotactic or mainly isotactic propylene homopolymers;

II) isotactic random copolymers of propylene with ethylene and/or C4-C8 alpha-olefins, such as 1-butene or 1-octene, wherein the total comonomer content ranges from 0.05 to 20 wt.-%, or mixtures of said copolymers with isotactic or mainly isotactic propylene homopolymers;

III) heterophasic copolymers comprising an isotactic propylene homopolymer like (I) or random copolymers of propylene like (II), and an elastomeric fraction comprising copolymers of ethylene with propylene and/or a C4-C8 a-olefin, such as 1-butene or 1 -octene, optionally containing minor amounts of a diene, such as butadiene, 1,4-hexadiene, 1,5-hexadiene, ethylidene-1-norbornene.

A further preferred embodiment of the present invention stipulates that component a1) has a density in the range of 0.895 to 0.920 g/cm$^3$, preferably in the range of 0.900 to 0.915 g/cm$^3$ as determined in accordance with ISO 1183.

According to still a further embodiment of the present invention the melt flow rate (MFR) of component a1) is in the range of 0.5 to 300 g/10 min, preferably in the range of 1.0 to 150 g/10 min and alternatively in the range of 1.5 to 50 g/10 min as determined in accordance with ISO 1133 (at 230° C.; 2.16 kg load).

In another preferred embodiment of the present invention the melting temperature of component a1) is within the range of 130 to 170° C., preferably in the range of 140 to 168° C. and more preferably in the range of 142 to 166° C. In case it is a propylene homopolymer like item (I) above it will have a melting temperature in the range of 150 to 170° C., preferably in the range from 155 to 168° C. and more preferably in the range of 160 to 166° C. as determined by differential scanning calorimetry (DSC) according to ISO 11357-3. In case it is a random copolymer of propylene like item (II) above it will have a melting temperature in the range of 130 to 162° C., preferably in the range of 135 to 160° C. and more preferably in the range of 140 to 158° C. as determined by DSC according to ISO 11357-3.

The polyethylene a2) is preferably a high density polyethylene (HDPE) or a linear low density polyethylene (LLDPE) or a long-chain branched low density polyethylene (LDPE). The comonomer content of component a2) is usually below 50 wt.-% preferably below 25 wt.-% and most preferably below 15 wt.-%.

Herein a HDPE suitable for use as component a2) has a density as determined according to ISO 1183 of equal to or greater than 0.941 g/cm$^3$, preferably in the range of 0.941 to 0.965 g/cm$^3$ and more preferably in the range of 0.945 to 0.960 g/cm$^3$.

According to another preferred embodiment, the HDPE is an ethylene homopolymer. A HDPE suitable for use as component a2) in this disclosure generally has a MFR determined by ISO 1133 (at 190° C.; 2.16 kg load), in the range of 0.01 g/10 min to 50 g/10 min, preferably in the range of 0.1 to 30 g/10 min, like in the range of 0.5 to 20 g/10 min.

The HDPE may also be a copolymer, for example a copolymer of ethylene with one or more alpha-olefin monomers such as propylene, butene, hexene, etc.

A LLDPE suitable for use as component a2) in this disclosure generally has a density as determined with ISO 1183, in the range of 0.900 to 0.920 g/cm$^3$, or in the range of 0.905 to 0.918 g/cm$^3$, or in the range of 0.910 to 0.918 g/cm$^3$ and an MFR determined by ISO 1133 (at 190° C.; 2.16 kg load), in the range of 0.01 to 50 g/min, or in the range of 0.1 to 30 g/10 min, like in the range of 0.5 to 20 g/10 min. The LLDPE is a copolymer, for example a copolymer of ethylene with one or more alpha-olefin monomers such as propylene, butene, hexene, etc.

A LDPE suitable for use as component a2) in this disclosure generally has a density as determined with ISO 1183, in the range of 0.915 to 0.935 g/cm$^3$, and an MFR determined by ISO 1133 (190° C.; 2.16 kg), in the range of 0.01 to 20 g/min. The LDPE is an ethylene homopolymer.

According to a further preferred embodiment the melting temperature of component a2) is in the range from 100 to 135° C. and preferably in the range from 105 to 132° C.

Such post-consumer and/or post-industrial waste can be derived from inter alia waste electrical and electronic equipment (WEEE) or end-of-life vehicles (ELV) or from differentiated waste collection schemes like the German DSD system, the Austrian ARA system and the Austrian ASZ system (especially for Purpolen materials) or the Italian “Raccolta Differenziata” system.

Recycled materials are commercially available, e.g. from Corpela (Italian Consortium for the collection, recovery, recycling of packaging plastic wastes), Resource Plastics Corp. (Brampton, ON), Kruschitz GmbH, Plastics and Recycling (AT), Ecoplast (AT), Vogt Plastik GmbH (DE), mtm plastics GmbH (DE) etc.

A preferred recycled polymer blend is Purpolen PP, being a recycled polymer mixture comprising polyethylene and polypropylene obtained from mtm plastics GmbH, Niedergebra, Germany. Another preferred recycled polymer blend is Dipolen, being a recycled polymer mixture comprising polyethylene and polypropylene obtained from mtm plastics GmbH, Niedergebra, Germany.

Component B)

The polymer composition in accordance with the present invention comprises as component B) 4.5 to 25 wt.-% based on the overall weight of the polymer composition of a virgin ethylene alkyl (meth)acrylate having the following properties: $MFR_2$ (190° C., 2.16 kg) determined according to ISO 1133 in the range from 0.1 to 15 g/10 min; and an alkyl (meth)acrylate content based on the total weight of component B) in the range from 5 to 40 wt.-%.

Preferred embodiments of component B) will be discussed in the following.

According to one preferred embodiment in accordance with the present invention component B) is an ethylene alkyl acrylate, preferably an ethylene methyl acrylate and/or an ethylene butyl acrylate.

Still another preferred embodiment in accordance with the present invention stipulates that component B) is an ethylene methyl acrylate having a $MFR_2$ (190° C., 2.16 kg) determined according to ISO 1133 in the range from 0.1 to 10 g/10 min, preferably from in the range from 0.2 to 5 g/10 min and more preferably in the range from 0.4 to 1.0 g/10 min; and/or an methyl acrylate content based on the total weight of component B) in the range from 10 to 35 wt.-%; preferably in the range from 15 to 30 wt.-% and more preferably in the range from 23 to 27 wt.-%.

In still another preferred embodiment in accordance with the present invention component B) is an ethylene butyl acrylate having a $MFR_2$ (190° C., 2.16 kg) determined according to ISO 1133 in the range from 0.1 to 10 g/10 min, preferably from in the range from 0.2 to 8 g/10 min and more preferably in the range from 0.6 to 5.0 g/10 min; and/or an butyl acrylate content based on the total weight of component B) in the range from 10 to 40 wt.-%; preferably in the range from 12 to 35 wt.-% and more preferably in the range from 16 to 28 wt.-%.

A preferred ethylene methyl acrylate is commercially available under the tradename Elvaloy AC1125 from Dow/DuPont.

A preferred ethylene butyl acrylate is commercially available under the tradenames Ebantix E1704 or Ebantix E2770 from Repsol.

Additives

The polymer composition according to the present invention may also comprise additives.

Preferably these additives are selected from the group consisting of slip agents, UV-stabilisers, pigments, antiacids, antioxidants, antiblocking agents, antistatic agents, additive carriers, nucleating agents and mixtures thereof, more preferably the at least one additive are antioxidants, whereby these additives preferably are present in 0 to 5 wt.-%, more preferably in 0.1 to 4 wt.-% and most preferably in the range of 0.2 to 0.4 wt.-% based on the overall weight of the polymer composition.

Examples of antioxidants which may be used, are sterically hindered phenols (such as CAS No. 6683-19-8, also sold as Irganox 1010 FF™ by BASF), phosphorous based antioxidants (such as CAS No. 31570-04-4, also sold as Hostanox PAR 24 (FF)™ by Clariant, or Irgafos 168 (FF)™ by BASF), sulphur based antioxidants (such as CAS No. 693-36-7, sold as Irganox PS-802 FL™ by BASF), nitrogen-based antioxidants (such as 4,4'-bis(1,1'-dimethylbenzyl) diphenylamine), or antioxidant blends.

Examples for anti-acids which may be used in the polymer compositions according to the present invention are calcium stearates, sodium stearates, zinc stearates, magnesium and zinc oxides, synthetic hydrotalcite (e.g. SHT, CAS-No. 11097-59-9), lactates and lactylates, as well as calcium stearate (CAS No. 1592-23-0) and zinc stearate (CAS No. 557-05-1).

Antiblocking agents that may be used in the polymer compositions according to the present invention are natural silica such as diatomaceous earth (such as CAS No. 60676-86-0 (SuperfFloss™), CAS-No. 60676-86-0 (SuperFloss E™), or CAS-No. 60676-86-0 (Celite 499™)), synthetic silica (such as CAS-No. 7631-86-9, CAS-No. 7631-86-9, CAS-No. 7631-86-9, CAS-No. 7631-86-9, CAS-No. 7631-86-9, CAS-No. 7631-86-9, CAS-No. 112926-00-8, CAS-No. 7631-86-9, or CAS-No. 7631-86-9), silicates (such as aluminium silicate (Kaolin) CAS-no. 1318-74-7, sodium aluminum silicate CAS-No. 1344-00-9, calcined kaolin CAS-No. 92704-41-1, aluminum silicate CAS-No. 1327-36-2, or calcium silicate CAS-No. 1344-95-2), synthetic zeolites (such as sodium calcium aluminosilicate hydrate CAS-No. 1344-01-0, CAS-No. 1344-01-0, or sodium calcium aluminosilicate, hydrate CAS-No. 1344-01-0).

UV-stabilisers which might be used in the polymer compositions according to the present invention are, for example, Bis-(2,2,6,6-tetramethyl-4-piperidyl)-sebacate (CAS-No. 52829-07-9, Tinuvin 770); 2-hydroxy-4-n-°Ctoxy-benzophenone (CAS-No. 1843 May 6, Chimassorb 81).

Nucleating agents that can be used in the polymer compositions according to the present invention are for example sodium benzoate (CAS No. 532-32-1) or 1,3:2,4-bis(3,4-dimethylbenzylidene) sorbitol (CAS 135861-56-2, Millad 3988).

Suitable antistatic agents are, for example, glycerol esters (CAS No. 97593-29-8) or ethoxylated amines (CAS No. 71786-60-2 or 61791-31-9) or ethoxylated amides (CAS No. 204-393-1).

Polymer Composition

Below preferred embodiments of the polymer composition according to the present invention will be discussed.

According to one preferred embodiment in according with the present invention the polymer composition has a $MFR_2$ (230° C., 2.16 kg) determined according to ISO 1133 in the range of 0.5 to 40 g/10 min, preferably in the range of 1.0 to 10 g/10 min or 11 to 25 g/10 min and more preferably in the range of 1.5 to 6.5 g/10 min or 12 to 20 g/10 min.

Still another preferred embodiment in accordance with the present invention stipulates that the polymer composition has a Tensile Strain at Break measured according to ISO527-2 in the range of 10 to 750%, preferably in the range of 10 to 50% or 50 to 700% and more preferably in the range of 17 to 40% or 200 to 650%.

In another preferred embodiment in accordance with the present invention the polymer composition has a Charpy Notched Impact Strength measured according to ISO 179-

1eA at 23° C. of more than 2.0 $KJ/m^2$, preferably in the range of 3.0 to 60 $kJ/m^2$, more preferably in the range of 3.0 to 50 $KJ/m^2$ or 5 to 45 $KJ/m^2$.

According to a further preferred embodiment in accordance with the present invention the content of component A) in the polymer composition is in the range from 76 to 95.1 wt.-%, preferably in the range from 77 to 95 wt.-% or in the range from 80 to 95 wt.-% based on the overall weight of the polymer composition.

Still another preferred embodiment in accordance with the present invention stipulates that the content of component B) in the polymer composition is in the range from 4.9 to 24 wt.-% and preferably in the range from 5 to 23 wt.-% or in the range from 5 to 20 wt.-% based on the overall weight of the polymer composition.

According to a further preferred embodiment in accordance with the present invention the content of polypropylene a1) in component A) is in the range from 75 up to 98 wt.-%, preferably from 75 to 95 wt.-%, more preferably in the range from 76 to 85 wt.-%, still more preferably in the range from 78 to 82 wt.-% and most preferably in the range from 79 to 81 wt.-% based on the overall weight of component A), or the content of polypropylene a1) in component A) is in the range from 25 to 85 wt.-%, preferably in the range from 40 to 80 wt.-%, more preferably in the range from 50 to 65 wt.-% and most preferably in the range from 56 to 57 wt.-% based on the overall weight of component A), even more preferably component a1) comprises more than 95 wt.-%, still more preferably from 96 to 99.9 wt.-% isotactic polypropylene and most preferably consists of isotactic polypropylene.

In another preferred embodiment in accordance with the present invention the content of polypropylene a2) in component A) is in the range from 5 to 25 wt.-%, preferably in the range from 15 to 24 wt.-%, more preferably in the range from 18 to 22 wt.-% and most preferably in the range from 19 to 21 wt.-% based on the overall weight of component A); or the content of polypropylene a2) in component A) is in the range from 15 to 75 wt.-%, preferably in the range from 20 to 60 wt.-%, more preferably in the range from 35 to 50 wt.-% and most preferably in the range from 43 to 44 wt.-% based on the overall weight of component A).

A further preferred embodiment of the present invention stipulates that component B) is an ethylene methyl acrylate and the polymer composition has a Tensile Strain at Break measured according to ISO527-2 being at least 10% higher, preferably in the range of 10 to 600% higher, more preferably 100 to 500% higher and most preferably 300 to 500% higher than for the same polymer composition without component B).

According to still a further preferred embodiment according to the present invention component B) is an ethylene methyl acrylate and the polymer composition has a Charpy Notched Impact Strength measured according to ISO 179-1eA at 23° C. being at least 2% higher, preferably in the range of 10 to 800% higher, more preferably 20 to 700% higher and most preferably 100 to 650% higher than for the same polymer composition without component B).

A further preferred embodiment of the present invention stipulates that component B) is an ethylene butyl acrylate and the polymer composition has a Tensile Strain at Break measured according to ISO527-2 being at least 10% higher, preferably in the range of 20 to 600% higher, more preferably 30 to 500% higher and most preferably 200 to 500% higher than for the same polymer composition without component B).

According to still a further preferred embodiment according to the present invention component B) is an ethylene butyl acrylate and the polymer composition has a Charpy Notched Impact Strength measured according to ISO 179-1eA at 23° C. being at least 2% higher, preferably in the range of 10 to 1400% higher, more preferably 20 to 1300% higher and most preferably 100 to 1250% higher than for the same polymer composition without component B).

A preferred polymer composition in accordance with the present invention comprises at least the following components and preferably consists of these components:

A) 75 to 95 wt.-%, preferably 80 to 95 wt.-% based on the overall weight of the polymer composition of a polymer blend, comprising
  a1) polypropylene;
  a2) polyethylene;
wherein the weight ratio of a1) to a2) is from 3:7 to 9:1, preferably from 8:1 to 11:1; and
wherein the polymer blend A) is a recycled material;
B) 5 to 25 wt.-%, preferably 5 to 20 wt.-% based on the overall weight of the polymer composition of a virgin ethylene alkyl acrylate, preferably an ethylene methyl acrylate or an ethylene butyl acrylate having the following properties
  $MFR_2$ (190° C., 2.16 kg) determined according to ISO 1133 in the range from 0.1 to 10 g/10 min and preferably in the range from 0.6 to 5 g/10 min; or 0.4 to 1 g/10 min and
  an alkyl acrylate content based on the total weight of component B) in the range from 5 to 40 wt.-%, preferably in the range from 16 to 28 wt.-% or 23 to 27 wt.-%;
with the proviso that the weight proportions of components A) and B) add up to 100 wt.-%. Process The process for manufacturing a polymer composition according to the present invention comprises the following steps:

i) providing a polymer blend A) of a recycled material comprising a1) polypropylene and a2) polyethylene in a weight ratio of a1) to a2) from 3:7 to 9:1 in an amount of 75.5 to 95.5 wt.-% based on the overall weight of the polymer composition;
ii) providing a virgin ethylene alkyl (meth)acrylate B) having the following properties
  $MFR_2$ (190° C., 2.16 kg) determined according to ISO 1133 in the range from 0.1 to 15 g/10 min; and
  an alkyl (meth)acrylate content based on the total weight of component B) in the range from 5 to 40 wt.-%;
iii) melting and mixing components A) and B) to obtain the polymer composition; and
iv) optionally, cooling down the polymer composition obtained in step iii) and/or pelletizing the polymer composition.

A preferred embodiment in accordance with the present invention stipulates that component B) is an ethylene methyl acrylate having a $MFR_2$ (190° C., 2.16 kg) determined according to ISO 1133 in the range from 0.1 to 10 g/10 min, preferably from in the range from 0.2 to 5 g/10 min and more preferably in the range from 0.4 to 1.0 g/10 min.

Still another preferred embodiment in accordance with the present invention stipulates that component B) has a methyl acrylate content based on the total weight of component B) in the range from 10 to 35 wt.-%; preferably in the range from 15 to 30 wt.-% and more preferably in the range from 23 to 27 wt.-%.

According to a further preferred embodiment in accordance with the present invention component B) is an ethylene butyl acrylate having a $MFR_2$ (190° C., 2.16 kg) determined according to ISO 1133 in the range from 0.1 to 10 g/10 min, preferably from in the range from 0.2 to 8 g/10 min and more preferably in the range from 0.6 to 5.0 g/10 min.

Still another preferred embodiment in accordance with the present invention stipulates that component B) has a butyl acrylate content based on the total weight of component B) in the range from 10 to 40 wt.-%; preferably in the range from 12 to 35 wt.-% and more preferably in the range from 16 to 28 wt.-%.

All preferred aspects and embodiments as described above shall also hold for the process according to the present invention.

Use

The present invention also relates to the use of a virgin ethylene alkyl (meth)acrylate B) having the following properties: $MFR_2$ (190° C., 2.16 kg) determined according to ISO 1133 in the range from 0.1 to 15 g/10 min; and an alkyl (meth)acrylate content based on the total weight of component B) in the range from 5 to 40 wt.-%; for increasing the Tensile Strain at Break measured according to ISO527-2; and/or the Charpy Notched Impact Strength measured according to ISO 179-1eA at 23° C. of a polymer blend A) of a recycled material comprising a1) polypropylene and a2) polyethylene in a weight ratio of a1) to a2) from 3:7 to 9:1; whereby the virgin ethylene alkyl (meth)acrylate B) is present in amount of 4.5 to 25 wt.-% based on the overall weight of components A) and B).

All preferred aspects and embodiments as described above shall also hold for the use according to the present invention.

Article

The present invention also relates to an article comprising the polymer composition according to the invention, preferably said article is selected from selected from the group consisting of consumer goods or houseware, preferably caps, closures and packaging containers.

The invention will now be described with reference to the following non-limiting examples.

EXPERIMENTAL PART

Measuring Methods

The following definitions of terms and determination methods apply for the above general description of the invention as well as to the below examples unless otherwise defined.

Melt Flow Rate (MFR)

MFR was measured according to ISO 1133 at a load of 2.16 kg ($MFR_2$), at 230° C. for polypropylene and MFR was measured according to ISO 1133 at a load of 2.16 kg ($MFR_2$) at 190° C. for polyethylene. For compounds comprising a mixture of both polypropylene and polyethylene, MFR was measured both at a load of 2.16 kg ($MFR_2$), at 230° C. and at a load of 2.16 kg ($MFR_2$) at 190° C.

Melting Temperature $T_m$, Crystallization Temperature Tc and Melting Enthalpy $H_m$ The melting temperature was determined with a TA Instrument Q2000 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature ($T_c$) is determined from the cooling step, while melting temperature ($T_m$) and melting enthalpy ($H_m$) are determined from the second heating step. For calculating the melting enthalpy 50° C. is used as lower integration limit. Melting and crystallization temperatures were taken as the peaks of endotherms and exotherms.

Tensile Modulus and Tensile Strain at Break

The measurements were conducted after 96 h conditioning time (at 23° C. at 50% relative humidity) of the test specimen.

Tensile Modulus was measured according to ISO 527-2 (cross head speed=1 mm/min; 23° C.) using injection moulded specimens as described in EN ISO 1873-2 (dog bone shape, 4 mm thickness).

Tensile Strain at Break was measured according to ISO 527-2 (cross head speed=50 mm/min; 23° C.) using injection moulded specimens as described in EN ISO 1873-2 (dog bone shape, 4 mm thickness).

Charpy Notched Impact Strength

Charpy Notched impact strength was determined (after 96 hours of conditioning at 23° C. and 50% relative humidity) according to ISO 179 1eA at 23° C. using 80×10×4 $mm^3$ test bars injection moulded in line with EN ISO 1873-2.

Density

Density of the materials was measured according to ISO 1183-1.

Determination of Butyl Acrylate- and Methyl Acrylate-Content in EBA and EMA

Below is exemplified the determination of the polar comonomer content of ethylene butyl acrylate and ethylene methyl acrylate. The weight-% can be converted to mol-% by calculation and is well documented in the literature.

(1) Ethylene Copolymers Containing Butyl Acrylate

Film samples of the polymers were prepared for the FTIR measurement: 0.5 to 0.7 mm thickness was used for ethylene butyl acrylate >6 wt.-% butylacrylate content and 0.05 to 0.12 mm thickness was used for ethylene butyl acrylate <6 wt.-% butylacrylate content.

After the FT-IR analysis the maximum absorbance for the peak for the butyl acrylate >6 wt.-% at 3450 $cm^{-1}$ was subtracted with the absorbance value for the base line at 3510 $cm^{-1}$ ($A_{butylacrylate}-A_{3510}$). Then the maximum absorbance peak for the polyethylene peak at 2020 $cm^{-1}$ was subtracted with the absorbance value for the base line at 2120 $cm^{-1}$ ($A_{2020}-A_{2120}$). The ratio between ($A_{butylacrylate}-A_{3510}$) and ($A_{2020}-A_{2120}$) was then calculated in the conventional manner, which is well documented in the literature.

The maximum absorbance for the peak for the comonomer butylacrylate <6 wt.-% at 1165 $cm^{-1}$ was subtracted with the absorbance value for the base line at 1865 $cm^{-1}$ ($A_{butyl\ acrylate}-A_{1865}$). Then the maximum absorbance peak for polyethylene peak at 2660 $cm^{-1}$ was subtracted with the absorbance value for the base line at 1865 $cm^{-1}$ ($A_{2660}-A_{1865}$). The ratio between ($A_{butyl\ acrylate}-A_{1865}$) and ($A_{2660}-A_{1865}$) was then calculated.

(2) Ethylene Copolymers Containing Methyl Acrylate

Film samples of the polymers were prepared for the FTIR measurement: 0.1 mm thickness was used for ethylene methyl acrylate >8 wt.-% methyl acrylate content and 0.05 mm thickness was used for ethylene methyl acrylate <8 wt.-% methyl acrylate content.

After the analysis the maximum absorbance for the peak for the methyl acrylate >8 wt.-% at 3455 $cm^{-1}$ was subtracted with the absorbance value for the base line at 3510 $cm^{-1}$ ($A_{methylacrylate}-A_{3510}$). Then the maximum absorbance peak for the polyethylene peak at 2675 $cm^{-1}$ was subtracted with the absorbance value for the base line at 2450 $cm^{-1}$ ($A_{2675}-A_{2450}$). The ratio between ($A_{methylacrylate}-A_{3510}$) and $(A_{2675}-A_{2450})$ was then calculated in the conventional manner, which is well documented in the literature.

The maximum absorbance for the peak for the comonomer methyl acrylate <8 wt.-% at 1164 $cm^{-1}$ was subtracted with the absorbance value for the base line at 1850 $cm^{-1}$ $(A_{methyl\ acrylate}-A_{1850})$. Then the maximum absorbance peak for polyethylene peak at 2665 $cm^{-1}$ was subtracted with the absorbance value for the base line at 1850 $cm^{-1}$ $(A_{2665}-A_{1850})$. The ratio between $(A_{methyl\ acrylate}-A_{1850})$ and $(A_{2665}-A_{1850})$ was then calculated.

Determination of the Content of Isotactic Polypropylene (iPP), Polystyrene (PS), Ethylene, PVC and Polyamide-6 in Component A)

Sample Preparation

All calibration samples and samples to be analyzed were prepared in similar way, on molten pressed plates. Around 2 to 3 g of the compounds to be analyzed were molten at 190° C. Subsequently, for 20 seconds 60 to 80 bar pressure was applied in a hydraulic heating press. Next, the samples are cooled down to room temperature in 40 seconds in a cold press under the same pressure, in order to control the morphology of the compound. The thickness of the plates was controlled by metallic calibrated frame plates 2.5 cm by 2.5 cm, 100 to 200 μm thick (depending MFR from the sample); two plates were produced in parallel at the same moment and in the same conditions. The thickness of each plate was measured before any FTIR measurements; all plates were between 100 to 200 μm thick.

To control the plate surface and to avoid any interference during the measurement, all plates were pressed between two double-sided silicone release papers.

In case of powder samples or heterogeneous compounds, the pressing process was repeated three times to increase homogeneity by pressed and cutting the sample in the same conditions as described before.

Spectrometer:

Standard transmission FTIR spectroscope such as Bruker Vertex 70 FTIR spectrometer was used with the following set-up:

- a spectral range of 4000-400 $cm^{-1}$,
- an aperture of 6 mm,
- a spectral resolution of 2 $cm^{-1}$,
- with 16 background scans, 16 spectrum scans,
- an interferogram zero filling factor of 32,
- Norton Beer strong apodisation.

Spectrum were recorded and analysed in Bruker Opus software.

Calibration Samples:

As FTIR is a secondary method, several calibration standards were compounded to cover the targeted analysis range, typically from:

- 0.2 wt.-% to 2.5 wt.-% for PA
- 0.1 wt.-% to 5 wt.-% for PS
- 0.2 wt.-% to 2.5 wt.-% for PET
- 0.1 wt.-% to 4 wt.-% for PVC The following commercial materials were used for the compounds: Borealis HC600TF as iPP, Borealis FB3450 as HDPE and for the targeted polymers such RAMAPET N1S (Indorama Polymer) for PET, Ultramid® B36LN (BASF) for Polyamide 6, Styrolution PS 486N (Ineos) for High Impact Polystyrene (HIPS), and for PVC Inovyn PVC 263B (under powder form).

All compounds were made at small scale in a Haake kneader at a temperature below 265° C. and less than 10 minutes to avoid degradation. Additional antioxidant such as Irgafos 168 (3000 ppm) was added to minimise the degradation.

Calibration:

The FTIR calibration principal was the same for all the components: the intensity of a specific FTIR band divided by the plate thickness was correlated to the amount of component determined by $^{1}H$ or $^{13}C$ solution state NMR on the same plate.

Each specific FTIR absorption band was chosen due to its intensity increase with the amount of the component concentration and due to its isolation from the rest of the peaks, whatever the composition of the calibration standard and real samples.

This methodology was described in the publication from Signoret et al. "Alterations of plastic spectra in MIR and the potential impacts on identification towards recycling", Resources, conservation and Recycling journal, 2020, volume 161, article 104980.

The wavelength for each calibration band was:

- 3300 $cm^{-1}$ for PA,
- 1601 $cm^{-1}$ for PS,
- 1410 $cm^{-1}$ for PET,
- 615 $cm^{-1}$ for PVC,
- 1167 $cm^{-1}$ for iPP.

For each polymer component i, a linear calibration (based on linearity of Beer-Lambert law) was constructed. A typical linear correlation used for such calibrations is given below:

$$x_i = A_i \cdot \frac{E_i}{d} + B_i$$

where $x_i$ is the fraction amount of the polymer component i (in wt %)

$E_i$ is the absorbance intensity of the specific band related to the polymer component i (in a.u. absorbance unit). These specific bands are, 3300 $cm^{-1}$ for PA, 1601 $cm^{-1}$ for PS, 1410 $cm^{-1}$ for PET, 615 $cm^{-1}$ for PVC, 1167 $cm^{-1}$ for iPP d is the thickness of the sample plate $A_i$ and $B_i$ are two coefficients of correlation determined for each calibration curve No specific isolated band can be found for C2 rich fraction and as a consequence the C2 rich fraction is estimated indirectly, $$x_{C2\,rich} = 100 - (x_{iPP} + x_{PA} + x_{PS} + x_{PET} + x_{EVA} + x_{PVC} + x_{chalk} + x_{talc})$$

The EVA, Chalk and Talc contents are estimated "semi-quantitatively". Hence, this renders the C2 rich content "semi-quantitative".

For each calibration standard, wherever available, the amount of each component is determined by either $^{1}H$ or $^{13}C$ solution state NMR, as primary method (except for PA). The NMR measurements were performed on the exact same FTIR plates used for the construction of the FTIR calibration curves.

Calibration standards were prepared by blending iPP and HDPE to create a calibration curve. The thickness of the films of the calibration standards were 300 μm. For the quantification of the iPP, PS and PA 6 content in the samples quantitative IR spectra were recorded in the solid-state using a Bruker Vertex 70 FTIR spectrometer. Spectra were recorded on 25×25 mm square films of 50 to 100 μm thickness prepared by compression moulding at 190° C. and 4 to 6 mPa. Standard transmission FTIR spectroscopy was employed using a spectral range of 4000 to 400 $cm^{-1}$, an aperture of 6 mm, a spectral resolution of 2 $cm^{-1}$, 16 background scans, 16 spectrum scans, an interferogram zero filling factor of 32 and Norton Beer strong apodisation.

The absorption of the band at 1167 $cm^{-1}$ in iPP was measured and the iPP content was quantified according to a calibration curve (absorption/thickness in cm versus iPP content in wt.-%).

The absorption of the band at 1601 $cm^{-1}$ (PS) and 3300 $cm^{-1}$ (PA6) were measured and the PS- and PA6 content quantified according to the calibration curve (absorption/thickness in cm versus PS and PA content in wt.-%). The content of ethylene was obtained by subtracting the content of iPP, PS and PA6 from 100. The analysis was performed as double determination.

Amount of Talc and Chalk

The amount of talc and chalk were measured by Thermogravimetric Analysis (TGA); experiments were performed with a Perkin Elmer TGA 8000. Approximately 10 to 20 mg of material was placed in a platinum pan. The temperature was equilibrated at 50° C. for 10 minutes, and afterwards raised to 950° C. under nitrogen at a heating rate of 20° C./min. The weight loss between ca. 550° C. and 700° C. (WCO2) was assigned to $CO_2$ evolving from $CaCO_3$, and therefore the chalk content was evaluated as:

$$\text{Chalk content} = 100/44 \times WCO2$$

Afterwards the temperature was lowered to 300° C. at a cooling rate of 20° C./min. Then the gas was switched to oxygen, and the temperature was raised again to 900° C. The weight loss in this step was assigned to carbon black (Wcb). Knowing the content of carbon black and chalk, the ash content excluding chalk and carbon black was calculated as:

$$\text{Ash content} = (\text{Ash residue}) - 56/44 \times WCO2 - Wcb$$

Where Ash residue is the wt.-% measured at 900° C. in the first step conducted under nitrogen. The ash content is estimated to be the same as the talc content for the investigated recyclates.

Amount of Paper, Wood

Paper and wood is determined by conventional laboratory methods including milling, floatation, microscopy and Thermogravimetric Analysis (TGA).

Amount of Metals

The amount of metals is determined by x ray fluorescence (XRF).

Amount of Limonene

The amount of limonene is determined by solid phase microextraction (HS-SPME-GC-MS).

Amount of Total Fatty Acids

The amount of total fatty acids is determined by solid phase microextraction (HS-SPME-GC-MS).

A. Materials Used

Component A)

Purpolen PP

Purpolen PP is a recycled polymer mixture comprising polyethylene and polypropylene obtained from mtm plastics GmbH, Niedergebra, Germany. Table 1 below shows the composition of the batch used in the Working Examples.

TABLE 1

Composition of Purpolen PP used in the Working Examples.

| | content of component a1) determined by FTIR | content of component a2) determined by FTIR |
|---|---|---|
| Purpolen PP | 85.9 wt.-% | 12.7 wt.-% |

The content of components a1) and a2) in Purpolen PP adds up with PS (0.1 wt.-%), talc (0.7 wt.-%), chalk PA 6 (0.2 wt.-%) (content also determined by FTIR) and other substances in minor amounts to 100 wt.-% ($MFR_2$ (230° C.) of the used Purpolen PP was 20.9 g/10 min).

Dipolen S

Dipolen S is a recycled polymer mixture comprising polyethylene and polypropylene obtained from mtm plastics GmbH, Niedergebra, Germany. Table 2 below shows the composition of the batch used in the Working Examples.

TABLE 2

Composition of Dipolen S used in the Working Examples.

| | content of component a1) determined by FTIR | content of component a2) determined by FTIR |
|---|---|---|
| Dipolen S | 57.0 wt.-% | 36.0 wt. % |

The content of components a1) and a2) adds up with PS (3.3 wt.-%), PA 6 (0.8 wt.-%), talc (0.5 wt.-%), chalk (0.5 wt.-%) and other substances in minor amounts to 100 wt.-% ($MFR_2$ (190° C.) of the used Dipolen S was 3.2 g/10 min, $MFR_2$ (230° C.) was 5.3 g/10 min).

Component B)

EMA is an ethylene methyl acrylate ($MFR_2$ 190° C.=0.5 g/10 min, MA content=25 wt.-% based on the total weight of the polymer), commercially available under the tradename Elvaloy AC1125 from Dow/DuPont.

EBA1 is an ethylene butyl acrylate ($MFR_2$ 190° C.=0.85 g/10 min, BA content=17 wt.-% based on the total weight of the polymer) which was produced as follows.

Fresh ethylene and recycled ethylene and comonomer butyl acrylate were compressed to reach an initial reactor pressure of 2500 bars in two parallel streams to supply the front and the side of a split feed 2 zone reactor with a varying L/D between around 17300 to 30400. Comonomer was added in amounts to reach 17 wt.-% in the final polymer. An $MFR_2$ of the final polymer of 0.85 g/10 min was maintained. After compression, the front stream was heated to 151° C. in a preheating section before entering the front zone of the reactor and the side stream was cooled and entered at the side of the reactor. Mixtures of commercially available peroxide radical initiators dissolved in an essentially inert hydrocarbon solvent were injected after the preheating section and at one more position along the reactor in amounts sufficient for the exothermal polymerisation reaction to reach peak temperatures of 275° C., and 260° C. respectively, with cooling in-between to 170° C. The reaction mixture was depressurised by a pressure control valve, cooled and the polymer was separated from unreacted gas.

EBA2 is an ethylene butyl acrylate (EBA, $MFR_2$ 190° C.=4.5 g/10 min, BA content=27 wt.-% based on the total weight of the polymer) which was produced as follows.

Fresh ethylene and recycled ethylene and comonomer butyl acrylate were compressed to reach an initial reactor pressure of 2500 bars in two parallel streams to supply the front and the side of a split feed 2 zone reactor with a varying L/D between around 17300 to 30400. Comonomer was added in amounts to reach 27 wt.-% in the final polymer. An $MFR_2$ of the final polymer of 4.5 g/10 min was maintained. After compression, the front stream was heated to 160° C. in a preheating section before entering the front zone of the reactor and the side stream was cooled and entered at the side of the reactor. Mixtures of commercially available peroxide radical initiators dissolved in an essentially inert hydrocarbon solvent were injected after the preheating section and at one more position along the reactor in amounts sufficient for the exothermal polymerisation reaction to reach peak temperatures of 275° C., and 275° C. respectively, with cooling in-between to 165° C. The reaction mixture was depressurised by a pressure control valve, cooled and the polymer was separated from unreacted gas.

AO is a blend of commercially available antioxidants mainly containing Irganox B 225 (FF) commercially available from BASF (CH).

C. Experimental Results

The polymer compositions according to the inventive examples (IE1 to IE15) and the comparative examples (CE1 to CE4) were prepared on a Coperion ZSK24, L/D ratio 40. A compounding temperature of 190 to 235° C. was used during mixing, solidifying the melt strands in a water bath followed by strand pelletization. The amounts of the different components in the polymer compositions and the properties of the polymer compositions according to the inventive examples and the comparative examples can be gathered from below Tables 3 to 6.

TABLE 3

Polymer compositions comprising EMA and their properties.

| | Unit | CE1 | IE1 | IE2 | IE3 |
|---|---|---|---|---|---|
| Components | | | | | |
| PURPOLEN PP | wt.-% | 99.7 | 94.7 | 89.7 | 79.7 |
| EMA | wt.-% | — | 5 | 10 | 20 |
| AO | wt.-% | 0.3 | 0.3 | 0.3 | 0.3 |
| Properties | | | | | |
| $MFR_2$ (230° C.) | g/10 min | 21.23 | 19.02 | 17.02 | 14.51 |
| Charpy NIS (23° C.) | kg/m$^2$ | 5.93 | 6.06 | 7.55 | 9.21 |
| Δ Charpy NIS (23° C.) | % | — | 2 | 27 | 55 |
| Tensile strain at break (23° C.) | % | 13.79 | 18.3 | 19.83 | 31.66 |
| Δ Tensile strain at break (23° C.) | % | — | 33 | 44 | 130 |

The polymer compositions shown in Table 3 above do all contain the same type of recyclate (Purpolen PP). The polymer composition according to CE1 consists of this recyclate and an antioxidant mixture. IE1 contains in addition 5 wt.-% of EMA and the EMA content is increased to 10 and 20 wt.-% for IE2 and IE3 respectively. As can be gathered from Table 3, with increasing content of EMA the toughness, expressed by the Charpy Notched Impact Strength and the Tensile strain at break at 23° C., of the polymer compositions increases. A small increase for the Charpy Notch Impact Strength and a significant increase for the Tensile Strain are already observed after addition of 5 wt.-% EMA, the use of higher amounts allows to obtain recyclate-based polymer compositions having significantly increased Charpy Notch Impact Strength and Tensile strain at break.

TABLE 4

Polymer compositions comprising EMA and their properties.

| | Unit | CE2 | IE4 | IE5 | IE6 |
|---|---|---|---|---|---|
| Components | | | | | |
| Dipolen S | wt.-% | 99.7 | 94.7 | 89.7 | 79.7 |
| EMA | wt.-% | — | 5.0 | 10 | 20 |
| AO | wt.-% | 0.3 | 0.03 | 0.3 | 0.3 |
| Properties | | | | | |
| $MFR_2$ (190° C.) | g/10 min | 2.57 | 2.36 | 2.22 | 1.94 |
| $MFR_2$ (230° C.) | g/10 min | 5.74 | 5.36 | 5.19 | 4.71 |
| Charpy NIS (23° C.) | kg/m$^2$ | 5.52 | 7.52 | 10.54 | 40.97 |
| Δ Charpy NIS (23° C.) | % | — | 36 | 91 | 642 |
| Tensile strain at break (23° C.) | % | 94.6 | 224.6 | 452.54 | 477.15 |
| Δ Tensile strain at break (23° C.) | % | — | 137 | 378 | 404 |

The polymer compositions shown in Table 4 above do all contain the same type of recyclate (Dipolen S). The polymer composition according to CE2 consists of this recyclate and an antioxidant mixture. IE4 contains in addition 5 wt.-% of EMA and the EMA content is increased to 10 and 20 wt.-% for IE5 and IE6 respectively. As can be gathered from Table 4, with increasing content of EMA the toughness, expressed by the Charpy Notched Impact Strength and the Tensile Strain at 23° C., of the polymer compositions increases. Already after addition of 5 wt.-% EMA a significant increase for the Charpy Notch Impact Strength and the Tensile Strength is observed, the addition of higher amounts allows to obtain recyclate-based polymer compositions having excellent Charpy Notch Impact Strength and Tensile Strain.

TABLE 5

Polymer compositions comprising EBA and their properties.

| | Unit | CE3 | IE7 | IE8 | IE9 |
|---|---|---|---|---|---|
| Components | | | | | |
| PURPOLEN PP | wt.-% | 99.7 | 94.7 | 89.7 | 79.7 |
| EBA2 | wt.-% | — | 5 | 10 | 20 |
| AO | wt.-% | 0.3 | 0.3 | 0.3 | 0.3 |
| Properties | | | | | |
| $MFR_2$ (230° C.) | g/10 min | 21.23 | 19.57 | 19.04 | 18.05 |
| Charpy NIS (23° C.) | kg/m$^2$ | 5.93 | 6.1 | 7.21 | 8.57 |
| Δ Charpy NIS (23° C.) | % | — | 3 | 22 | 45 |
| Tensile Modulus (23° C.) | MPa | 1273 | 1196 | 1087 | 902 |
| Δ Tensile Modulus (23° C.) | % | — | −6 | −15 | −29 |
| Tensile strain at break (23° C.) | % | 13.79 | 19.72 | 20.6 | 39.52 |
| Δ Tensile strain at break (23° C.) | % | — | 43 | 49 | 187 |
| Tensile Strength (23° C.) | MPa | 25.25 | 23.79 | 22.39 | 19.73 |
| Δ Tensile Strength (23° C.) | % | — | −6 | −11 | −22 |

The polymer compositions shown in Table 5 above do all contain the same type of recyclate (Purpolen PP). The polymer composition according to CE3 consists of this recyclate and an antioxidant mixture. IE7 contains in addition 5 wt.-% of EBA and the EBA content is increased to 10 and 20 wt.-% for IE8 and IE9 respectively. As can be gathered from Table 5, with increasing content of EBA the toughness, expressed by the Charpy Notched Impact Strength and the Tensile Strain at 23° C., of the polymer compositions increases. A small increase for the Charpy Notch Impact Strength and a significant increase for the tensile strain at break are already observed after addition of 5 wt.-% EBA, the use of higher amounts allows to obtain recyclate-based polymer compositions having significantly increased Charpy Notch Impact Strength and Tensile strain at break.

TABLE 6

Polymer compositions comprising EBA and their properties.

| Components | Unit | CE4 | IE10 | IE11 | IE12 | IE13 | IE14 | IE15 |
|---|---|---|---|---|---|---|---|---|
| Dipolen S | wt.-% | 99.7 | 94.7 | 89.7 | 79.7 | 94.7 | 89.7 | 79.7 |
| EBA1 | wt.-% | — | 5 | 10 | 20 | — | — | — |
| EBA2 | wt.-% | — | — | — | — | 5 | 10 | 20 |
| AO502 | wt.-% | 0.3 | 0.3 | 0.3 | 0.3 | 0.3 | 0.3 | 0.3 |
| Properties | | | | | | | | |
| $MFR_2$ (190° C.) | g/10 min | 2.57 | 2.36 | 2.2 | 2.08 | 2.59 | 2.68 | 2.88 |
| $MFR_2$ (230° C.) | g/10 min | 5.74 | 5.29 | 5.12 | 5.06 | 5.89 | 6.25 | 6.77 |
| Charpy NIS (23° C.) | $kg/m^2$ | 5.52 | 6.24 | 7.31 | 20.58 | 6.19 | 7.45 | 26.55 |
| Δ Charpy NIS (23° C.) | % | — | 13 | 32 | 273 | 12 | 35 | 381 |
| Tensile Strain (23° C.) | % | 94.6 | 135.75 | 221.96 | 410.17 | 152.74 | 374.88 | 409.9 |
| Δ Tensile Strain (23° C.) | % | — | 43 | 135 | 334 | 61 | 296 | 333 |

The polymer compositions shown in Table 6 above do all contain the same type of recyclate (Dipolen S). The polymer composition according to CE4 consists of this recyclate and an antioxidant mixture. IE10 and IE13 contain in addition 5 wt.-% of EBA and the EBA content is increased to 10 and 20 wt.-% for IE11, IE12, IE14 and IE15 respectively. As can be gathered from Table 6, with increasing content of EBA the toughness, expressed by the Charpy Notched Impact Strength and the Tensile strain at break at 23° C., of the polymer compositions increases. Already after addition of 5 wt.-% EBA a significant increase for the Charpy Notch Impact Strength and the Tensile Strength is observed, the addition of higher amounts allows to obtain recyclate-based polymer compositions having excellent Charpy Notch Impact Strength and Tensile strain at break.

The invention claimed is:

1. A polymer composition comprising at least the following components:

A) in an amount of 75 to 95.5 wt.-% based on the overall weight of the polymer composition of a polymer blend, comprising
  a1) polypropylene;
  a2) polyethylene;

wherein the weight ratio of a1) to a2) is from 3:7 to 9:1; and wherein the polymer blend A) is a recycled material; and B) in an amount of 4.5 to 25 wt.-% based on the overall weight of the polymer composition of a virgin ethylene alkyl acrylate and/or or alkyl methacrylate polymer having the following properties
  · $MFR_2$ (190° C., 2.16 kg) determined according to ISO 1133 in the range from 0.1 to 15 g/10 min; and
  · an alkyl acrylate and/or alkyl methacrylate content based on the total weight of component B) in the range from 5 to 40 wt.-%;

with the proviso that the weight proportions of components A) and B) add up to 100 wt.-%.

2. The polymer composition according to claim 1, wherein:

component A) comprises 80.0 to 99.9 wt.-% based on the overall weight of component A) of a1) and a2); and/or component A) comprises less than 5 wt.-% based on the overall weight of component A) of thermoplastic polymers different from a1) and a2); and/or component A) comprises less than 5 wt.-% based on the overall weight of component A) of talc; and/or component A) comprises less than 4 wt.-% based on the overall weight of component A) of chalk; and/or component A) comprises less than 1 wt.-% based on the overall weight of component A) of paper.

3. The polymer composition according to claim 1, wherein:

component A) comprises less than 1 wt.-% based on the overall weight of component A) of wood; and/or component A) comprises less than 1 wt.-% based on the overall weight of component A) of metal; and/or component A) comprises less than 100 ppm based on the overall weight of component A) of limonene; and/or component A) comprises less than 200 ppm based on the overall weight of component A) of fatty acids; and/or component A) is a recycled material, which is recovered from waste plastic material derived from post-consumer and/or post-industrial waste; and/or the $MFR_2$ (230° C., 2.16 kg) determined according to ISO 1133 of component A) is in the range of 2 to 50 g/10 min.

4. The polymer composition according to claim 1, wherein component B) is an ethylene alkyl acrylate polymer.

5. The polymer composition according to claim 4, wherein:

component B) is an ethylene methyl acrylate polymer having a $MFR_2$ (190° C., 2.16 kg) determined according to ISO 1133 in the range from 0.1 to 10 g/10 min; and/or a methyl acrylate content based on the total weight of component B) in the range from 10 to 35 wt.-%.

6. The polymer composition according to claim 4, wherein:

component B) is an ethylene butyl acrylate polymer having a $MFR_2$ (190° C., 2.16 kg) determined according to ISO 1133 in the range from 0.1 to 10 g/10 min; and/or a butyl acrylate content based on the total weight of component B) is in the range from 10 to 40 wt.-%.

7. The polymer composition according to claim 1, wherein the polymer composition has a $MFR_2$ (230° C., 2.16 kg) determined according to ISO 1133 in the range of 0.5 to 40 g/10 min; and/or a Tensile Strain at Break measured according to ISO527-2 in the range of 10 to 750%; and/or a Charpy Notched Impact Strength measured according to ISO 179-1eA at 23° C. of more than 2.0 $kJ/m^2$.

8. The polymer composition according to claim 1, wherein:

component B) is an ethylene methyl acrylate and the polymer composition has a Tensile Strain at Break measured according to ISO527-2 that is at least 10% higher than for the same polymer composition without component B); and/or a Charpy Notched Impact Strength measured according to ISO 179-1eA at 23° C. that is at least 2% higher than for the same polymer composition without component B); or component B) is an ethylene butyl acrylate and the polymer composition has a Tensile Strain at Break measured according to ISO527-2 that is at least 10% higher than for the same polymer composition without component B); and/or a Charpy Notched Impact Strength measured according to ISO 179-1eA at 23° C. that is at least 2% higher than for the same polymer composition without component B).

9. The polymer composition according to claim 1, wherein:

the content of component A) in the polymer composition is in the range from 76 to 95.1 wt.-% based on the overall weight of the polymer composition; and/or the content of component B) in the polymer composition is in the range from 4.9 to 24 wt.-% based on the overall weight of the polymer composition; and/or the content of a1) in component A) is in the range from 75 up to 98 wt.-% based on the overall weight of component A); or the content of a1) in component A) is in the range from 25 to 85 wt.-% based on the overall weight of component A); and/or the content of a2) in component A) is in the range from 5 to 25 wt.-% based on the overall weight of component A); or the content of polypropylene a2) in component A) is in the range from 15 to 75 wt.-% based on the overall weight of component A).

10. The polymer composition according to claim 1, wherein:

the polymer composition comprises at least one additive selected from the group consisting of slip agents, UV-stabiliser, pigments, antioxidants, antiblocking agents, antistatic agents, anti-acids, additive carriers, and nucleating agents.

11. The polymer composition according to claim 10, wherein the additives are present in an amount up to 5 wt.-% based on the overall weight of the polymer composition.

12. The polymer composition according to claim 1, wherein:

the polymer composition comprises at least the following components

A) 75 to 95 wt.-% based on the overall weight of the polymer composition of a polymer blend, comprising a1) polypropylene and a2) polyethylene;

wherein the weight ratio of a1) to a2) is from 3:7 to 9:1, and wherein the polymer blend A) is a recycled material;

B) 5 to 25 wt.-% based on the overall weight of the polymer composition of a virgin ethylene alkyl acrylate, having the following properties:

· $MFR_2$ (190° C., 2.16 kg) determined according to ISO 1133 in the range from 0.1 to 10 g/10 min and · an alkyl acrylate content based on the total weight of component B) in the range from 5 to 40 wt.-%;

with the proviso that the weight proportions of components A) and B) add up to 100 wt.-%.

13. A process for manufacturing a polymer composition according to claim 1, comprising the following steps:

i) providing a polymer blend A) of a recycled material comprising a1) polypropylene and a2) polyethylene in a weight ratio of a1) to a2) from 3:7 to 9:1 in an amount of 75.5 to 95.5 wt.-% based on the overall weight of the polymer composition;

ii) providing a virgin ethylene alkyl acrylate or alkyl methacrylate B) having the following properties · $MFR_2$ (190° C., 2.16 kg) determined according to ISO 1133 in the range from 0.1 to 15 g/10 min; and · an alkyl acrylate or alkyl methacrylate content based on the total weight of component B) in the range from 5 to 40 wt.-%;

iii) melting and mixing components A) and B) to obtain the polymer composition; and iv) optionally, cooling down the polymer composition obtained in step iii) and/or pelletizing the polymer composition.

14. The process according to claim 13, wherein, component B) is an ethylene methyl acrylate having a $MFR_2$ (190° C., 2.16 kg) determined according to ISO 1133 in the range from 0.1 to 10 g/10 min; and/or a methyl acrylate content based on the total weight of component B) in the range from 10 to 35 wt.-%; or component B) is an ethylene butyl acrylate having a $MFR_2$ (190° C., 2.16 kg) determined according to ISO 1133 in the range from 0.1 to 10 g/10 min; and/or a butyl acrylate content based on the total weight of component B) in the range from 10 to 40 wt.-%.

15. A method of increasing the Tensile Strain at Break measured according to ISO527-2; and/or the Charpy Notched Impact Strength measured according to ISO 179-1eA at 23° C. of a polymer blend A) of a recycled material comprising a1) polypropylene and a2) polyethylene in a weight ratio of a1) to a2) from 3:7 to 9:1;

the method comprising combining with a virgin ethylene alkyl acrylate or alkyl methacrylate B) having the following properties · $MFR_2$ (190° C., 2.16 kg) determined according to ISO 1133 in the range from 0.1 to 15 g/10 min; and · an alkyl (meth)acrylate content based on the total weight of component B) in the range from 5 to 40 wt.-%;

such that the virgin ethylene alkyl (meth)acrylate B) is present in amount of 4.5 to 25 wt.-% based on the overall weight of components A) and B).

16. An article comprising the polymer composition according to claim 1.

* * * * *